J. D. RAFERT.
PRESLICED BREAD LOAF.
APPLICATION FILED NOV. 12, 1918.
1,319,899.  Patented Oct. 28, 1919.
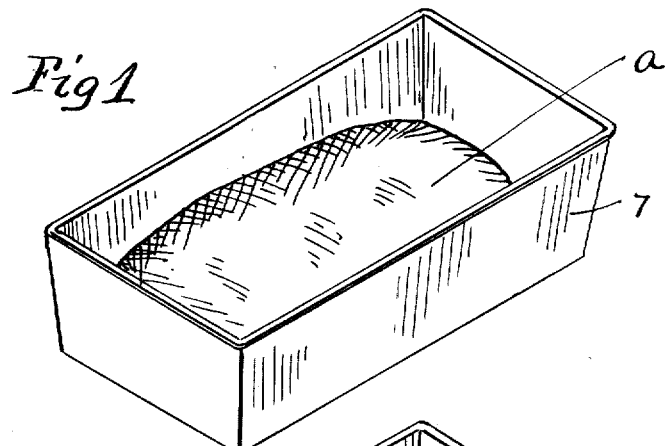
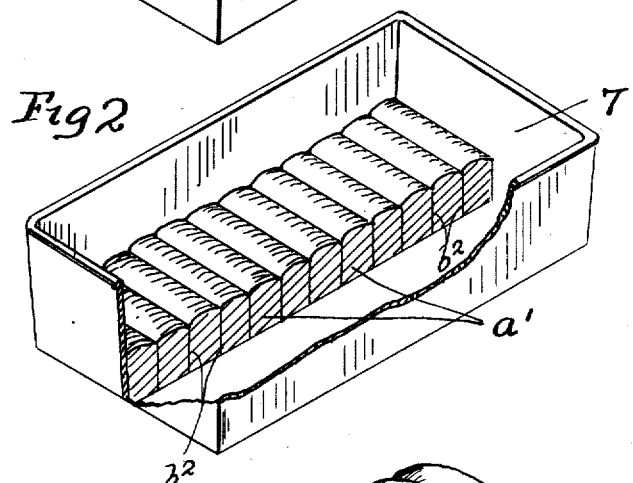
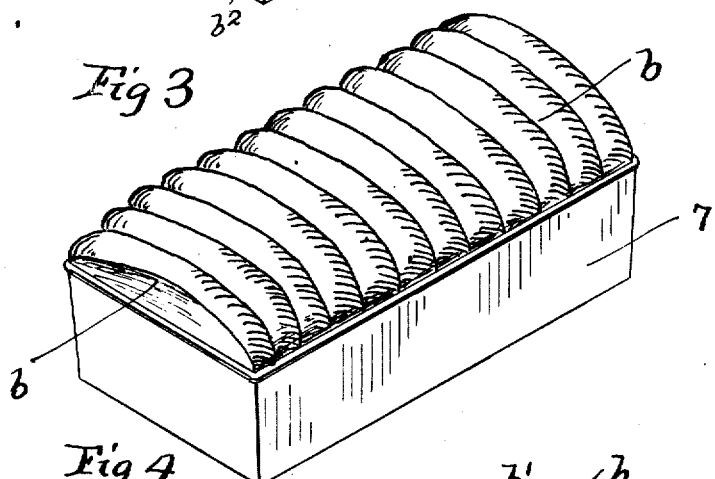
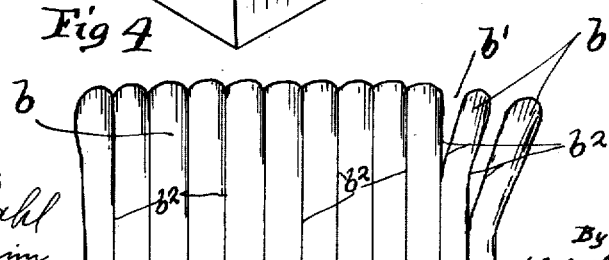
Inventor
J. D. RAFERT
By his Attorneys
Witnesses

UNITED STATES PATENT OFFICE.

JOHN D. RAFERT, OF MINNEAPOLIS, MINNESOTA, ASSIGNOR OF ONE-HALF TO HAROLD R. WARD, OF MINNEAPOLIS, MINNESOTA.

PRESLICED BREAD-LOAF.

1,319,899.     Specification of Letters Patent.     Patented Oct. 28, 1919.

Original application filed October 2, 1917, Serial No. 199,947. Divided and this application filed November 12, 1918. Serial No. 262,147.

*To all whom it may concern:*

Be it known that I, JOHN D. RAFERT, a citizen of the United States, residing at Minneapolis, in the county of Hennepin and State of Minnesota, have invented certain new and useful Improvements in Presliced Bread-Loaves; and I do hereby declare the following to be a full, clear, and exact description of the invention, such as will enable others skilled in the art to which it appertains to make and use the same.

My invention has for its object to provide as a new article of manufacture a baked loaf of bread consisting of a multiplicity of comparatively thin parallel slices primarily severed while in the form of kneaded dough before being finally raised and baked, but connected in the big loaf by such adhesion between the slices that the loaf may be handled as an entirety. As an important feature, the slices cut in the dough before baking are greased with lard or other suitable fatty matter and the flat parallel contacting faces of the slices are kept in close contact during the baking operation so that they form a fragile union or cohesion which, as indicated, will hold the slices together in loaf form under all ordinary handling, but will permit the slices to be pulled or pealed off, one at a time, when desired, without breaking the slices.

Preslicing of the loaf before baking allows an even escape of gases from the entire loaf while baking, and this causes the loaf to retain its sugars and improves the flavor of the baked loaf.

The fatty matter distributed over the contacting faces of the unbaked slices stimulates the gluten and gives the surfaces of the slices a flaky surface which keeps the bread more palatable, and also assists in conserving the moisture of the bread, both while it is in the form of a loaf and when separated into slices.

The process of baking the loaf and in obtaining the above product or new article of manufacture, is illustrated in the accompanying drawings wherein like characters indicate like parts throughout the several views.

Referring to the drawings—

Figure 1 is a perspective view showing a baking pan containing sufficient dough for one loaf of bread;

Fig. 2 is a perspective view, some parts being broken away and some parts sectioned, showing the pan with the presliced dough before the latter is finally raised and before it is baked;

Fig. 3 is a perspective view showing the baked loaf contained in the pan; and

Fig. 4 is a side elevation of the baked loaf with several slices partially severed from the loaf.

The numeral 7 indicates an ordinary baking pan of a size to contain the dough for one loaf of bread. In Fig. 1, the character $a$ indicates the dough from which the loaf is to be formed. In Fig. 2, the dough $a$, which has not yet been finally raised and which has not, of course, yet been baked, is cut into slices on the line $a^1$. In Figs. 3 and 4, the baked loaf is indicated, as an entirety, by the character $b$. In Fig. 1, the baked loaf is made up of the baked slices $b$ having contact at $b^1$, and, as already stated, the contacting faces of the slices being quite firmly united.

So far as the product is concerned, the loaf may be presliced and greased, as above indicated, in any suitable way, but preferably, it is accomplished by means of the apparatus disclosed and claimed in my earlier application S. N. 199,947, filed October 2, 1917, and entitled "Apparatus for preslicing unbaked bread loaves." In fact, the present application is filed as a division of said earlier application. By means of said apparatus, the knives are laden with grease so that when cutting the loaf they grease the contacting faces of the slices on lines marked $b^2$ on Figs. 2 and 4.

After the dough has been cut and its cut surfaces greased, as above described, it is left in the pan and put into the oven and baked.

The slices or sections of the baked loaf will, as already stated, quite closely adhere, that is, they will stick together closely and with sufficient firmness to prevent the slices from being accidentally separated under ordinary and even quite rough handling of the loaf. Nevertheless, the cohesion is so light or fragile that the slices, one at a time, may be pulled off from the loaf without breaking the slices. The flaky softened surface given to the slices makes the same very soft and palatable. It is found in practice that a loaf thus baked will maintain its moisture for a greater length of time than an ordinary integral loaf, and moreover, the slices, even when separated will not dry out as quickly as bread sliced from an ordinary loaf. However, a loaf of this kind is especially adapted to be placed on the table and the slices removed, as desired. This is particularly advantageous for army purposes where each soldier is given a predetermined amount or allowance of bread and where it is, therefore, desirable that the loaves be evenly sliced, so that each soldier gets his proper allowance, and a given number of loaves will always afford the predetermined number of slices. Nevertheless, for general use, the loaf thus baked is desirable.

The loaf may be properly described as made up of a multiplicity of thin slices, meaning thereby, slices such as would ordinarily be cut from a loaf when the bread is to be used as sliced bread.

What I claim is:

A baked loaf of bread made up of a multiplicity of thin slices formed with parallel faces united by close but fragile cohesion and adapted to be readily pulled or severed from the loaf, the contacting faces of the said slices being coated with fatty matter that has been subjected to heat in the baking of the loaf.

In testimony whereof I affix my signature in presence of two witnesses.

JOHN D. RAFERT.

Witnesses:
 CLARA DEMAREST,
 BERNICE G. BAUMANN.